(12) United States Patent
Quick et al.

(10) Patent No.: US 12,127,534 B1
(45) Date of Patent: Oct. 29, 2024

(54) AUTOMATED WET PET FOOD DISPENSER AND ASSOCIATED METHOD(S)

(71) Applicants: Joshua Quick, Tallahassee, FL (US); Merve Pamuk, Tallahassee, FL (US)

(72) Inventors: Joshua Quick, Tallahassee, FL (US); Merve Pamuk, Tallahassee, FL (US)

( * ) Notice: Subject to any disclaimer, the term of this patent is extended or adjusted under 35 U.S.C. 154(b) by 33 days.

(21) Appl. No.: 17/818,463

(22) Filed: Aug. 9, 2022

Related U.S. Application Data (60) Provisional application No. 63/260,074, filed on Aug. 9, 2021.

(51) Int. Cl.
*A01K 5/02* (2006.01)

(52) U.S. Cl.
CPC .................................. *A01K 5/0291* (2013.01)

(58) Field of Classification Search
CPC .. A01K 5/0291; A01K 5/0275; A01K 5/0283; A01K 7/02
See application file for complete search history.

(56) References Cited

U.S. PATENT DOCUMENTS

| | | | | |
|---|---|---|---|---|
| 3,726,438 A | * | 4/1973 | O'Rourke | A01K 61/85 119/51.13 |
| 3,985,104 A | * | 10/1976 | Klemer | A01K 5/0291 119/51.5 |
| 5,752,235 A | * | 5/1998 | Kehr | G08B 21/24 368/10 |
| 7,051,675 B1 | * | 5/2006 | Mayer | A01K 5/0291 222/650 |
| 11,062,622 B2 | * | 7/2021 | Ostler | G04F 3/06 |
| 11,712,022 B2 | * | 8/2023 | Zhu | A01K 5/0291 119/51.11 |
| 2005/0217591 A1 | * | 10/2005 | Turner | A01K 5/0114 119/51.02 |
| 2006/0213921 A1 | * | 9/2006 | Abdulhay | G07F 17/0092 221/130 |
| 2008/0289580 A1 | * | 11/2008 | Krishnamurthy | A01K 5/0291 119/51.11 |
| 2012/0060761 A1 | * | 3/2012 | Laro | A01K 5/0291 340/392.1 |
| 2021/0176957 A1 | * | 6/2021 | List | A01K 5/0275 |

* cited by examiner

*Primary Examiner* — Ebony E Evans
(74) *Attorney, Agent, or Firm* — Ashkan Najafi (57) ABSTRACT

The automated wet pet food dispenser includes a portable housing, a plurality of containers supported at the portable housing and configured to hold wet pet food, and a plurality of displacement mechanisms located within the portable housing and being in communication with the containers, respectively, a controller communicatively coupled to the displacement mechanisms, and a user interface in communication with the controller. Advantageously, the user interface is configured to program the controller. In this manner, the controller is configured to selectively toggle the displacement mechanisms between operable and inoperable modes such that the containers are ejected and retracted along bi-directional travel paths relative to the housing at pre-determined time intervals, as desired by a user.

14 Claims, 6 Drawing Sheets

AUTOMATED WET PET FOOD DISPENSER AND ASSOCIATED METHOD(S)

CROSS REFERENCE TO RELATED APPLICATIONS

This is a non-provisional patent application that claims priority to and benefit of U.S. provisional patent application No. 63/260,074 filed Aug. 9, 2021, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to pet food dispensers and, more particularly, to a specially configured automated wet pet food dispenser, which selectively opens and delivers sealed wet pet food at programmed delivery intervals.

Prior Art

There have been a number of inventions in automated and timed dispensing of pet food for pets like dogs and cats, as often pet owners need to leave their homes for work or for a weekend and need their pets fed when they are gone.

The challenge is that most inventions on the market work well only for dispensing dry pet food. However, a large percent of pet owners prefer wet food since dry food contains very little moisture which can lead to dehydration in pets. Further, a large percent of pets prefer wet or moist food over dry food.

Almost all current inventions on market which dispense wet food require the pet owner to open hermetically sealed commercially available pet food cans and load their contents into various compartments of an automated dispenser hours or days in advance of when the food will be actually dispensed to pets. Such exposed wet food is susceptible to bacterial infection. Also, open food attracts invertebrate pests, for example spiders, ants, flies, pill bugs which will infest food directly and lay eggs and indirectly infest food with their larvae. Finally open food could also attract mice, ants, and create unhygienic contamination problems in homes or apartment buildings where pets and pet owners reside.

Accordingly, there is a long-felt need to provide a method of and device for dispensing wet pet food in a manner that does not require the pet owner to be present for every feeding, and in a manner that a pet owner is provided with confirmation of preferably both delivery of wet food to the pet and eating of the food by the pet.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured automated wet pet food dispenser, which selectively opens and delivers sealed wet pet food at programmed delivery intervals. These and other objects, features, and advantages of the non-limiting exemplary embodiment(s) are provided by an automated wet pet food dispenser including a portable housing, a plurality of containers supported at the portable housing and configured to hold wet pet food, and a plurality of displacement mechanisms located within the portable housing and being in communication with the containers, respectively, a controller communicatively coupled to the displacement mechanisms, and a user interface in communication with the controller. Advantageously, the user interface is configured to program the controller. In this manner, the controller is configured to selectively toggle the displacement mechanisms between operable and inoperable modes such that the containers are ejected and retracted along bi-directional travel paths relative to the housing at pre-determined time intervals, as desired by a user. Notably, the controller is centrally disposed at a center of the portable housing. In this manner, the containers and the displacement mechanisms are each equidistantly offset from the controller. Such a structural configuration yields the new, useful, and unexpected result of delivering wet pet food in at eatable and unspoiled state.

In a non-limiting and exemplary embodiment, the portable housing includes an exterior perimeter including a plurality of apertures equidistantly juxtaposed therealong, wherein the containers are ingressed and egressed along mutually exclusive radial travel paths through the apertures, respectively. Such radial travel paths are planar to a support surface on which the housing is supported.

In a non-limiting and exemplary embodiment, each the displacement mechanism is mechanically and operably engaged with an associated one of the containers and includes a worm gear in communication with a sidewall of the associated container, and a motor having a rectilinear drive shaft in communication with the worm gear. Advantageously, the controller is operably connected to each rectilinear drive shaft and configured to independently and contemporaneously actuate each rectilinear drive shaft for bi-directionally displacing the containers relative to the peripheral edge of the housing.

In a non-limiting and exemplary embodiment, each the worm gear is configured to reciprocate the associated container along the bi-directional travel path and through the apertures, respectively.

In a non-limiting and exemplary embodiment, a cooling mechanism is in communication with the controller for regulating and maintaining an internal temperature of the housing below a threshold temperature level.

In a non-limiting and exemplary embodiment, the portable housing includes an exterior perimeter including a plurality of apertures equidistantly juxtaposed therealong. Advantageously, the containers are ingressed and egressed along mutually exclusive bi-directional radial travel paths through the apertures, respectively.

In a non-limiting and exemplary embodiment, each the displacement mechanism is mechanically and operably engaged with an associated one of the containers and includes a worm gear in communication with a sidewall of the associated container, and a motor having a rectilinear drive shaft in communication with the worm gear. Advantageously, the controller is operably connected to each rectilinear drive shaft and configured to independently and contemporaneously actuate each the rectilinear drive shaft.

In a non-limiting and exemplary embodiment, each the worm gear is configured to reciprocate the associated container along the bi-directional radial travel paths and through the apertures, respectively.

In a non-limiting and exemplary embodiment, automated wet pet food dispenser further includes a cooling mechanism in communication with the controller for regulating and maintaining an internal temperature of the housing below a threshold temperature level.

In a non-limiting and exemplary embodiment, the worm gear includes a stationary first gear portion directly and statically connected to the sidewall of the associated container, and a rotating second gear portion rotatably coupled directly to the stationary first gear portion. Advantageously, the motor has a drive shaft directly attached to the rotating second gear portion. In this manner, the stationary first gear portion is linearly displaced parallel to the bi-directional radial travel path.

In a non-limiting and exemplary embodiment, the drive shaft and the rotating second gear portion simultaneously articulate about an axis of rotation radially disposed relative to a center of the portable housing and parallel to the bi-directional radial travel paths.

In a non-limiting and exemplary embodiment, the plurality of containers are equidistantly juxtaposed along a circumferential edge of the portable housing.

In a non-limiting and exemplary embodiment, each of the motors are configured to chronologically open and close at a unique predetermined date and time.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

A non-limiting exemplary embodiment(s) of the present disclosure is referred to generally in FIGS. 1-7 and is intended to provide an automated wet pet food dispenser 10, which selectively opens and delivers sealed wet pet food at programmable delivery intervals. It should be understood that the exemplary embodiment(s) may be used to open and dispense a variety of wet pet food, and should not be limited to any particular wet pet food described herein.

Referring to FIGS. 1-7 in general, in a non-limiting exemplary embodiment(s), the automated wet pet food dispenser 10 is configured to deliver wet food to pets, wherein a sealed package may be opened by a machine and food dispensed into a bowl at the time of feeding for the animal. Optionally, a cooling element (e.g., thermoelectric cooling mechanism 40) may be employed, for maintaining the opened wet pet food at a suitable temperature, if desired.

Referring to FIGS. 1-7 in general, an automated drawer style feeder (dispenser 10) is disclosed, which ejects/retracts wet pet food along bidirectional radial travel paths 22. Multiple food receptacles may be contemporaneously ejected/retracted, for feeding multiple pets or to feed meals on different days. A portable controller 20 (e.g., containing executable software app) can be manipulated and programmed on a portable electronic device by a user. Also, a dedicated controller 20 may be mechanically affixed to the dispenser housing 11. Such a structural configuration yields the new, useful, and unpredicted result of enabling a user to modify the feeding schedule from a location remote to the dispenser 10.

Each receptacle may be configured to contain the pet's wet food. Such receptacles may be detachable from the housing 11, as needed for cleaning. A snap-fit connection or other suitable coupling may be employed without departing from the true spirit and scope of the present disclosure. Such a structural configuration yields the new, useful, and unpredicted result of preventing cross-contamination of leftover food from a previous day's scheduled feeding.

Referring to FIGS. 1-7 in general, the automated wet pet food dispenser 10 includes a portable housing 11, a plurality of containers 12 supported at the portable housing 11 and configured to hold wet pet food 50, and a plurality of displacement mechanisms 15 located within the portable housing 11 and being in communication with the containers 12, respectively, a controller 20 communicatively coupled to the displacement mechanisms 15, and a user interface 21 in communication with the controller 20. Advantageously, the user interface 21 is configured to program the controller 20. In this manner, the controller 20 is configured to selectively toggle the displacement mechanisms 15 between operable (accessible) and inoperable (inaccessible) modes such that the containers 12 are ejected and retracted along bi-directional radial travel paths 22 relative to the housing 11 at pre-determined time intervals (e.g., breakfast, lunch, dinner, etc.), as desired by a user. Notably, the controller 20 is centrally disposed at a center of the portable housing 11. In this manner, the containers 12 and the displacement mechanisms 15 are each equidistantly offset from the controller 20. Such a structural configuration yields the new, useful, and unexpected result of delivering wet pet food in an eatable and unspoiled state without cross-contamination of leftover pet food.

In a non-limiting and exemplary embodiment, the portable housing 11 includes an exterior perimeter 30 including a plurality of apertures 31 equidistantly juxtaposed therealong, wherein the containers 12 are ingressed and egressed along mutually exclusive bi-directional radial travel paths 22 through the apertures 31, respectively. Such bi-directional radial travel paths 22 are planar to a support surface 33 on which the housing 11 is supported. Such a structural configuration yields the new, useful, and unexpected result of delivering wet pet food in an eatable and unspoiled state without cross-contamination of leftover pet food.

In a non-limiting and exemplary embodiment, each displacement mechanism 15 is mechanically and operably engaged with an associated one of the containers 12 and includes a worm gear 34 in communication with a sidewall of the associated container 12, and a motor 35 having a rectilinear drive shaft 36 in communication with the worm gear 34. Advantageously, the controller 20 is operably connected to each rectilinear drive shaft 36 and configured to independently and contemporaneously actuate each rectilinear drive shaft 36 for bi-directionally (extend and retract) displacing (via path 22) the containers 12 relative to the peripheral edge 38 of the housing 11. Such a structural configuration yields the new, useful, and unexpected result of delivering wet pet food in an eatable and unspoiled state without cross-contamination of leftover pet food.

In a non-limiting and exemplary embodiment, each worm gear 34 is configured to reciprocate the associated container 12 along an associated bi-directional radial travel path 22 and through an associated aperture 31, respectively. Such a structural configuration yields the new, useful, and unexpected result of delivering wet pet food in an eatable and unspoiled state without cross-contamination of leftover pet food.

In a non-limiting and exemplary embodiment, a cooling mechanism 40 is in communication with the controller 20 for regulating and maintaining an internal temperature of the housing 11 below a threshold temperature level. Such a structural configuration yields the new, useful, and unexpected result of delivering wet pet food in an eatable and unspoiled state without cross-contamination of leftover pet food.

Figure 1:
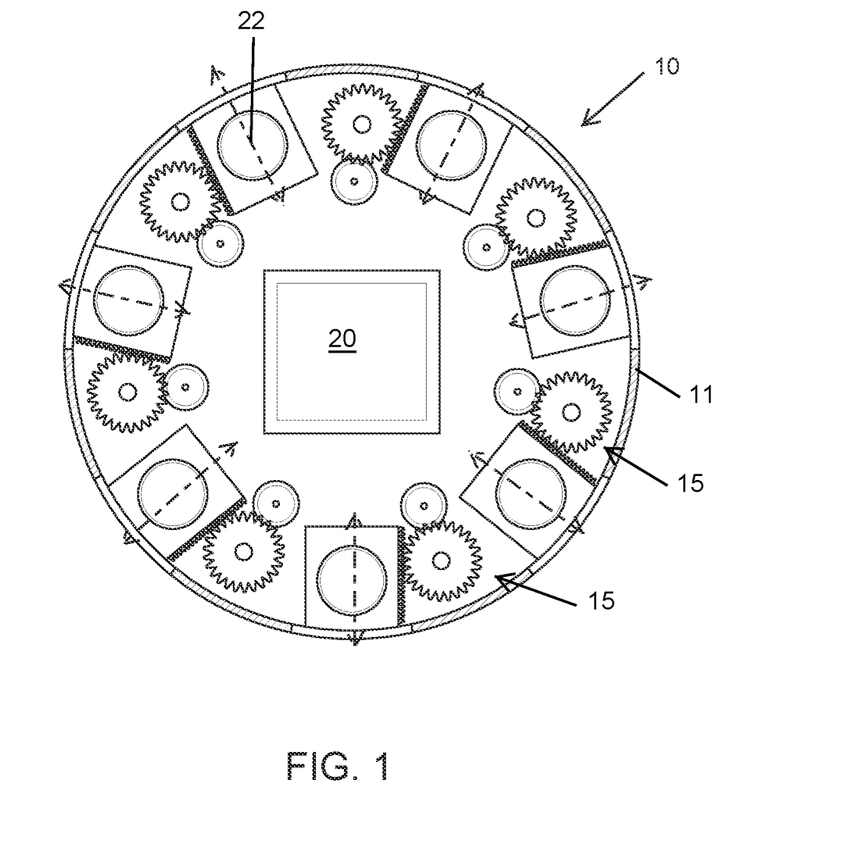
FIG. 1 is a cross-sectional view of the automated wet pet food dispenser, in accordance with a non-limiting exemplary embodiment of the present disclosure.
Figure 2:
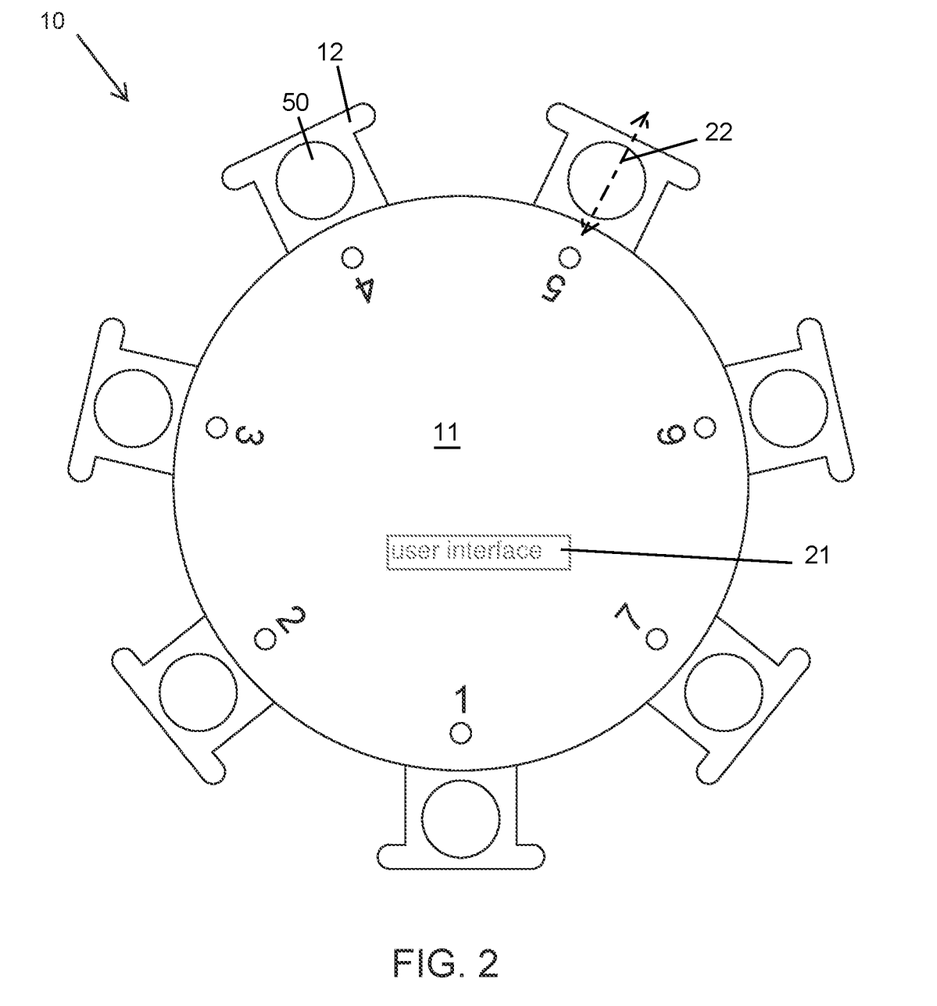
FIG. 2 is a top plan view of the automated wet pet food dispenser, in accordance with a non-limiting exemplary embodiment of the present disclosure.
Figure 3:
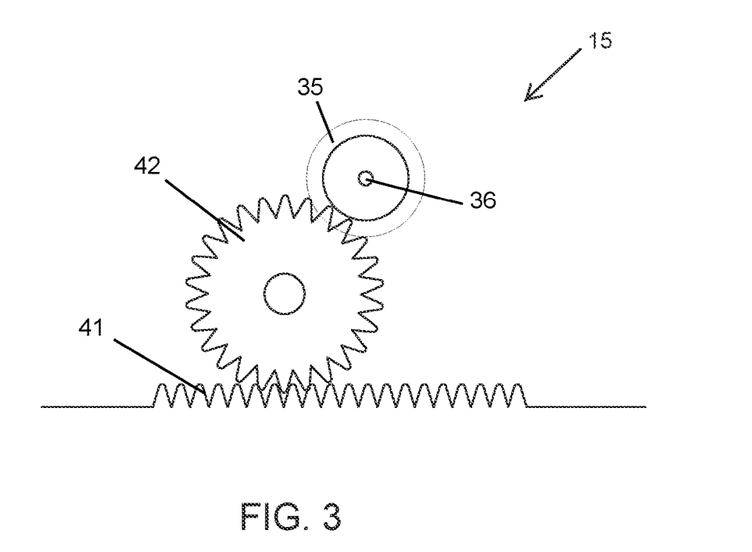
FIG. 3 is an enlarged side elevational view of a displacement mechanism, in accordance with a non-limiting exemplary embodiment of the present disclosure.
Figure 4:
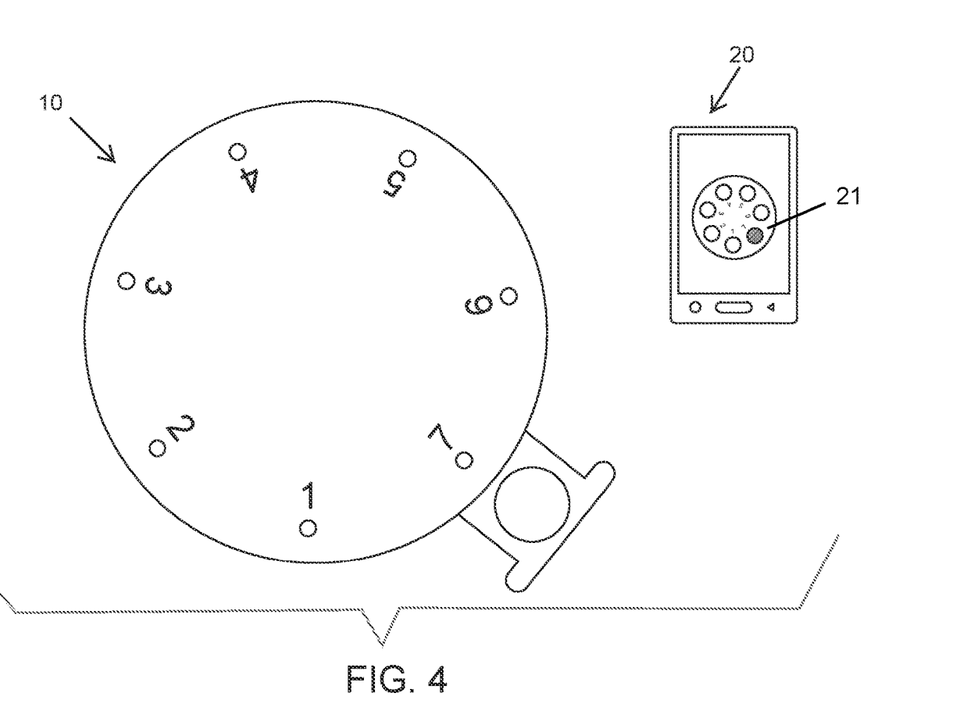
FIG. 4 is another top plan view of an automated wet pet food dispenser including a software app executable on a portable electronic device, in accordance with a non-limiting exemplary embodiment of the present disclosure.
Figure 5:
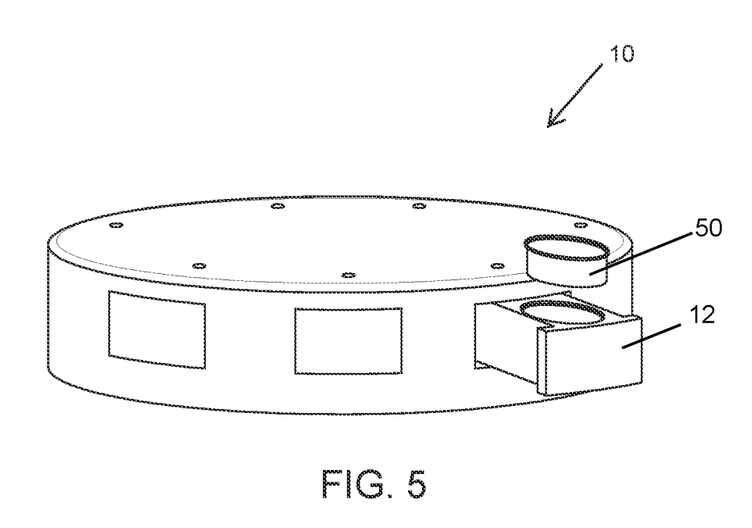
FIG. 5 is a perspective view of the automated wet pet food dispenser, in accordance with a non-limiting exemplary embodiment of the present disclosure.
Figure 6:
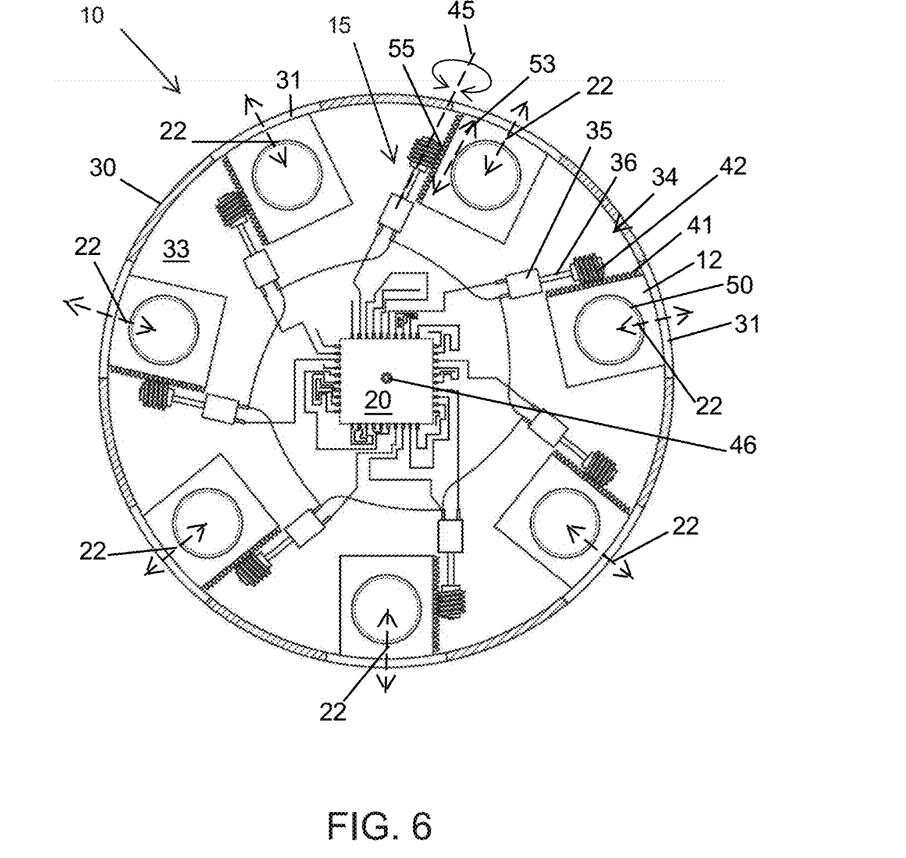
FIG. 6 is another cross-sectional view of the automated wet pet food dispenser, in accordance with a non-limiting exemplary embodiment of the present disclosure.

In a non-limiting and exemplary embodiment, the worm gear 34 includes a stationary first gear portion 41 directly and statically connected to the sidewall of the associated container 12, and a rotating second gear portion 42 rotatably coupled (at 55) directly to the stationary first gear portion 41. Advantageously, the motor drive shaft 36 is directly attached to the rotating second gear portion 42. In this manner, the stationary first gear portion 41 is linearly displaced (at 53) parallel to the bi-directional radial travel path 22. Such a structural configuration yields the new, useful, and unexpected result of delivering wet pet food in an eatable and unspoiled state without cross-contamination of leftover pet food.

In a non-limiting and exemplary embodiment, the drive shaft 36 and the rotating second gear portion 42 simultaneously articulate about an axis of rotation 45 radially disposed relative to a center 46 of the portable housing 11 and parallel to the bi-directional radial travel paths 22. Such a structural configuration yields the new, useful, and unexpected result of delivering wet pet food in an eatable and unspoiled state without cross-contamination of leftover pet food.

In a non-limiting and exemplary embodiment, the plurality of containers 12 are equidistantly juxtaposed along a circumferential (peripheral) edge 30 of the portable housing 11. Such a structural configuration yields the new, useful, and unexpected result of delivering wet pet food in an eatable and unspoiled state without cross-contamination of leftover pet food.

In a non-limiting and exemplary embodiment, each of the motors 35 is configured to chronologically (sequentially) open and close (extend and retract the pet food container 12) at a unique predetermined date and time (e.g., morning, afternoon, evening, etc.). Such a structural configuration yields the new, useful, and unexpected result of delivering wet pet food in an eatable and unspoiled state without cross-contamination of leftover pet food.

Figure 7:
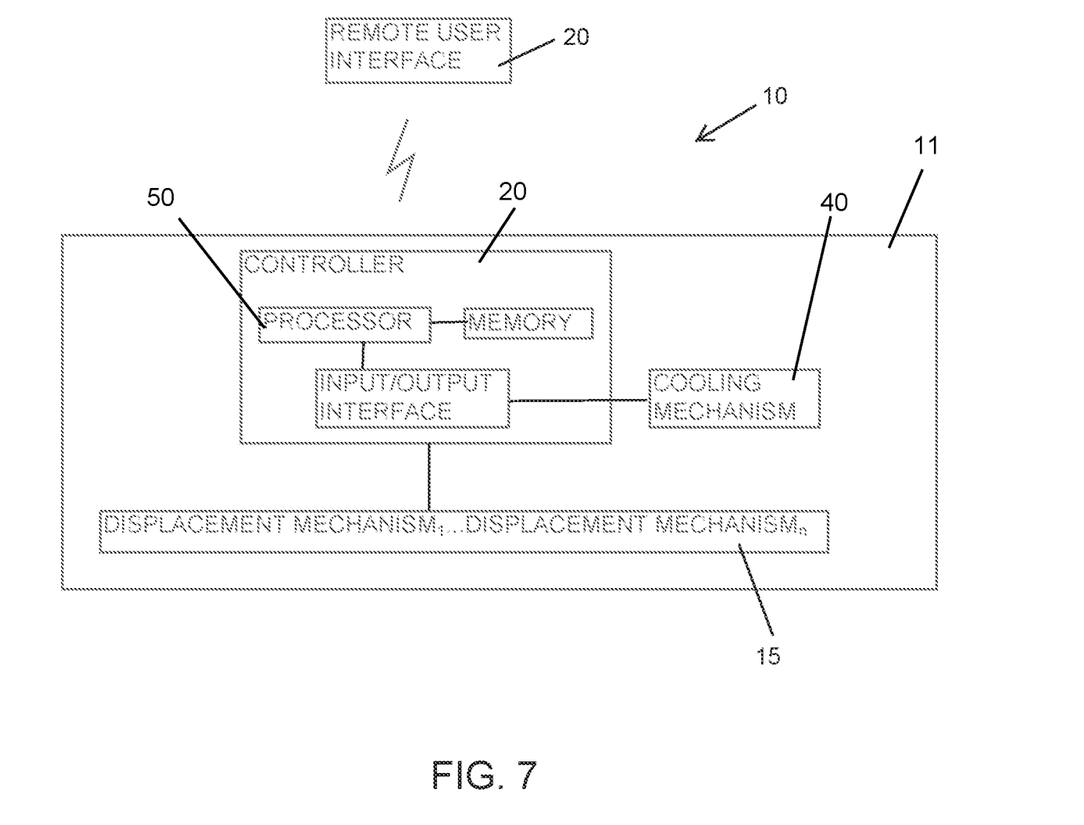
FIG. 7 is a high level schematic block diagram illustrating the interrelationship between some of the major electronic components of the automated wet pet food dispenser, in accordance with a non-limiting exemplary embodiment of the present disclosure.

The controller 20 includes a processor 50 such as a microprocessor or other devices capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor. The pet food delivery times can be programmed via a calendar or manual date/time selection from a graphical user interface on the software app or via buttons displayed on the housing 11.

Functions and process steps described herein may be performed using programmed computer devices and related hardware, peripherals, equipment and networks. When programmed, the computing devices are configured to perform functions and carry out steps in accordance with principles of the disclosure. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

The memory includes programmable software instructions that are executed by the processor. In particular, the programmable software instructions include a plurality of chronological operating steps that define a control logic algorithm for performing the intended functions of the present disclosure. Such software instructions may be written in a variety of computer program languages such as C++, Fortran and Pascal, for example. One skilled in the art understands that such software instructions may contain various Boolean logic processes that perform the intended function of the present disclosure. Therefore, the specific source or object code of the software program is not intended to be a limiting factor in executing the present disclosure's intended function.

The memory, which enables storage of data and programs, may include RAM, ROM, flash memory and any other form of readable and writable storage medium known in the art or hereafter developed. The memory may be a separate component or an integral part of another component such as processor.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement methods described herein.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The user interface 21 may include a variety of stand-alone or shared devices that are capable of generating and transmitting a control signal upon receiving a user input. For example, exemplary user interface 21 devices may include a remote controller 20 employing RF, infra-red, acoustic or cellular technology, as well known in the industry. In alternate embodiments, the user interface 21 may include a smart phone, a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present disclosure. Of course, the user interfaces may include other components, peripherals and software applications provided they are compatible and capable of cooperating with remaining devices of the present disclosure. In addition, the user interfaces may include information, documents, data and files needed to provide functionality and enable performance of methodologies in accordance with an exemplary embodiment of the disclosure.

One or more sensor(s), such as a motion and/or light sensor(s) may be provided for detecting an event, (e.g., position of a container 12, inoperable container 12, temperature of the wet pet food). Active and/or passive sensors may be used to react to detectable subject matter such as light, noise, radiation (e.g., heat), or changes in emitted energy, fields or beams. However, the disclosure is not limited to a particular type of sensor. Those skilled in the art will appreciate that other sensors may be used without departing from the scope of the disclosure. Examples of such other sensors include pressure sensitive mats; optical sensors configured to sense light; microwave sensors that use a Gunn diode operating within pre-set limits to transmit/flood a designated area/zone with an electronic field whereby movement in the zone disturbs the field and sets off an alarm; an ultrasonic sensor configured to react to a determined range of ultrasonic sound energy in a protected area; or any other sensor capable of providing motion detection capability in accordance with principles of the disclosure.

A display screen may be configured for displaying various amounts of textual and/or graphical information. The display may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information. Optionally, the display screen may be configured with a touch-screen interface, to present a user with a graphical user interface 21.

To attract attention, LEDs are operably coupled to the present disclosure's processing and signal generation components and configured to controllably flash. The disclosure is not limited to any restricted number or arrangement of LEDs. Any number and arrangement of LEDs could be provided, within the limits of the present disclosure's structure and components. For example, columns of LEDs could be provided, in addition to or in lieu of the rows of LEDs. The LEDs may flash if a triggering event is detected, for example. Additionally, any flashing patterns could be used. The LEDs could flash in harmony, randomly or sequentially, or groups (e.g., rows) could flash sequentially, randomly or alternately, or in any other manner likely to attract attention. One or more processing devices and one or more LED drivers manages flashing of the LEDs according to predetermined or user-specified data and instructions.

The power source may include one or more rechargeable or non-rechargeable disposable batteries, photovoltaic cells, and/or an AC adapter or other power supply means.

By way of example and not limitation, the communications device may communicate with the user interface 21 and/or controller 20 using one or more wireless LAN (WLAN) protocols, using low power, ultra-wide band (UWB) communication signals or some other type of wireless signals for RF or optical (e.g., infrared) communication of information between the controller 20 and the remote user interface 21. A real-time WLAN protocol or a standard wireless LAN protocol such as that of IEEE 802.11.times, Bluetooth or IrDA may be used without departing from the scope of the present disclosure. A local network that connects the communications device to their respective local computer systems may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

Optionally, various input/output ports and interfaces may be provided to communicate with peripherals, subsystems and systems. Such devices may include serial ports for bi-directional communications, and/or an optical communications (e.g., infrared) port for wireless line of sight communications. Other ports may include parallel and USB ports.

In an exemplary embodiment, the communications device facilitates digital communications between system components, such as the controller 20 and the remote user interface 21. The communications device may include, but is not limited to, Ethernet 100baseT, RS232, USB, and other serial communications modules. Optionally, the device could be implemented as a wireless communications component operating according to a wireless communication protocol, such as 802.11 or IRDA.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. An automated wet pet food dispenser comprising:
   a portable housing;
   a plurality of containers supported at said portable housing and configured to hold wet pet food;
   a plurality of displacement mechanisms located within said portable housing and being in communication with said containers, respectively;
   a controller communicatively coupled to said displacement mechanisms; and
   a user interface in communication with said controller;
   wherein said user interface is configured to program said controller;
   wherein said controller is configured to selectively toggle said displacement mechanisms between operable and inoperable modes such that said containers are ejected and retracted along bi-directional travel paths relative to said housing at pre-determined time intervals, as desired by a user;
   wherein said portable housing includes an exterior perimeter including a plurality of apertures equidistantly juxtaposed therealong; wherein said containers are ingressed and egressed along mutually exclusive bi-directional radial travel paths through said apertures, respectively;
   wherein each said displacement mechanism is mechanically and operably engaged with an associated one of said containers and includes a worm gear in communication with a sidewall of said associated container, and a motor having a rectilinear drive shaft in communication with said worm gear; wherein said controller is operably connected to each said rectilinear drive shaft and configured to independently and contemporaneously actuate each said rectilinear drive shaft.

2. The automated wet pet food dispenser of claim 1, wherein each said worm gear is configured to reciprocate said associated container along said bi-directional radial travel paths and through said apertures, respectively.

3. The automated wet pet food dispenser of claim 1, further comprising: a cooling mechanism in communication with said controller for regulating and maintaining an internal temperature of said housing below a threshold temperature level.

4. The automated wet pet food dispenser of claim 1, wherein said worm gear comprises:
   a stationary first gear portion directly and statically connected to said sidewall of said associated container; and
   a rotating second gear portion rotatably coupled directly to said stationary first gear portion;
   wherein said rectilinear drive shaft is directly attached to said rotating second gear portion;
   wherein said stationary first gear portion is linearly displaced parallel to said bi-directional radial travel path.

5. The automated wet pet food dispenser of claim 4, wherein said rectilinear drive shaft and said rotating second gear portion simultaneously articulate about an axis of rotation radially disposed relative to a center of said portable housing and parallel to said bi-directional radial travel paths.

6. The automated wet pet food dispenser of claim 4, wherein said plurality of containers are equidistantly juxtaposed along a circumferential edge of said portable housing.

7. The automated wet pet food dispenser of claim 1, wherein each of said motors are configured to chronologically open and close at a unique predetermined date and time.

8. An automated wet pet food dispenser comprising:
   a portable housing;
   a plurality of containers supported at said portable housing and configured to hold wet pet food;
   a plurality of displacement mechanisms located within said portable housing and being in communication with said containers, respectively;
   a controller communicatively coupled to said displacement mechanisms; and
   a user interface in communication with said controller;
   wherein said user interface is configured to program said controller;
   wherein said controller is configured to selectively toggle said displacement mechanisms between operable and inoperable modes such that said containers are ejected and retracted along bi-directional travel paths relative to said housing at pre-determined time intervals, as desired by a user;
   wherein said controller is centrally disposed at a center of said portable housing;
   wherein said containers and said displacement mechanisms are each equidistantly offset from said controller;
   wherein said portable housing includes an exterior perimeter including a plurality of apertures equidistantly juxtaposed therealong; wherein said containers are ingressed and egressed along mutually exclusive bi-directional radial travel paths through said apertures, respectively;
   wherein each said displacement mechanism is mechanically and operably engaged with an associated one of said containers and includes a worm gear in communication with a sidewall of said associated container, and a motor having a rectilinear drive shaft in communication with said worm gear; wherein said controller is operably connected to each said rectilinear drive shaft and configured to independently and contemporaneously actuate each said rectilinear drive shaft.

9. The automated wet pet food dispenser of claim 8, wherein each said worm gear is configured to reciprocate said associated container along said bi-directional radial travel paths and through said apertures, respectively.

10. The automated wet pet food dispenser of claim 8, further comprising: a cooling mechanism in communication with said controller for regulating and maintaining an internal temperature of said housing below a threshold temperature level.

11. The automated wet pet food dispenser of claim 10, wherein said worm gear comprises:
- a stationary first gear portion directly and statically connected to said sidewall of said associated container; and
- a rotating second gear portion rotatably coupled directly to said stationary first gear portion;
- wherein said rectilinear drive shaft is directly attached to said rotating second gear portion;
- wherein said stationary first gear portion is linearly displaced parallel to said bi-directional radial travel path.

12. The automated wet pet food dispenser of claim 11, wherein said rectilinear drive shaft and said rotating second gear portion simultaneously articulate about an axis of rotation radially disposed relative to a center of said portable housing and parallel to said bi-directional radial travel paths.

13. The automated wet pet food dispenser of claim 11, wherein said plurality of containers are equidistantly juxtaposed along a circumferential edge of said portable housing.

14. The automated wet pet food dispenser of claim 8, wherein each of said motors are configured to chronologically open and close at a unique predetermined date and time.

* * * * *